United States Patent
Soroka et al.

(10) Patent No.: US 9,286,614 B2
(45) Date of Patent: Mar. 15, 2016

(54) ELECTRONIC DIGITAL DIRECT-MAIL COLLATERAL

(76) Inventors: Matthew Soroka, Washington Township, NJ (US); Joseph Abrams, Grandview, NY (US)

( * ) Notice: Subject to any disclaimer, the term of this patent is extended or adjusted under 35 U.S.C. 154(b) by 908 days.

(21) Appl. No.: 12/378,449

(22) Filed: Feb. 13, 2009

(65) Prior Publication Data

US 2010/0198656 A1    Aug. 5, 2010

Related U.S. Application Data

(60) Provisional application No. 61/028,225, filed on Feb. 13, 2008.

(51) Int. Cl.
*G06Q 30/00* (2012.01)
*G06Q 30/02* (2012.01)
*G06Q 99/00* (2006.01)

(52) U.S. Cl.
CPC ............ *G06Q 30/02* (2013.01); *G06Q 30/0201* (2013.01); *G06Q 99/00* (2013.01)

(58) Field of Classification Search
CPC .................................................. G06Q 30/0207
USPC .......................................... 455/564; 705/14.1
See application file for complete search history.

(56) References Cited

U.S. PATENT DOCUMENTS

| | | | | |
|---|---|---|---|---|
| 6,035,217 A | * | 3/2000 | Kravitz | H04B 1/3833 455/564 |
| 8,341,858 B2 | * | 1/2013 | Clegg | B42D 15/022 40/124.03 |
| 2003/0003954 A1 | * | 1/2003 | Kugler | H04M 1/0287 455/556.1 |
| 2004/0248073 A1 | * | 12/2004 | Pinkerman | G06F 1/1626 434/308 |
| 2005/0271354 A1 | * | 12/2005 | Yeh | 386/46 |
| 2006/0003809 A1 | * | 1/2006 | Boling | G08B 15/00 455/564 |
| 2007/0187487 A1 | * | 8/2007 | Wilen | 235/380 |
| 2008/0167957 A1 | * | 7/2008 | Steelberg et al. | 705/14 |

FOREIGN PATENT DOCUMENTS

GB           2376844 A    * 12/2002

* cited by examiner

*Primary Examiner* — Michael Bekerman
(74) *Attorney, Agent, or Firm* — The Concept Law Group, P.A.; Scott D. Smiley; Mark C. Johnson (57) ABSTRACT

An electronic digital direct-mail collateral. In an embodiment, the device comprises a card stock mailer similar to a CD case, center hinged and printed with branded advertising information and graphic. The device may further comprise video, audio and cell phone operations.

14 Claims, 6 Drawing Sheets

Fig. 1

One Button with Call Center Model

Touchscreen Video with Phone Model

Recorded Message Model

Video Player with Mag Card Model

ELECTRONIC DIGITAL DIRECT-MAIL COLLATERAL

RELATED APPLICATIONS

The present application is based on provisional patent application No. 61/028,225 filed Feb. 13, 2008.

FIELD OF THE INVENTION

The present invention relates to an electronic digital direct-mail collateral. In an embodiment, the device comprises a mailer, printed with branded advertising information and graphics. The device may further comprise video, audio and cell phone operations.

BACKGROUND OF THE INVENTION

The traditional direct mail industry has not seen much in its development over the years. Even with outside influences on the internet, PDAs and the like, the direct mail business of today look similar to the direct mail business of yesterday. A typical direct mail campaign has not changed in over 50 years. The direct mailer must be designed, and printed, a mailing list must be prepared, either through in house or through purchasing a database from a reseller, and then the mailer must be mailed out. Once it is sent, there is only one way to actually track the results, and that is if the receiver purchases the promotion or product being promoted. A direct marketer can get some other information on the purchaser, if there is a call to action to call a toll free number, go to the promotion's website, or mail back a Business Reply Envelope (BRE) or Business Reply Card (BRC). On the internet, there is a lot of information a marketer can gain, from click-through rates on email marketing campaign, to deep programming on banner and search listings. Unfortunately, the direct mail industry does not have these in its possession to harness the information, and gain insight on the receiver, nor the direct mail campaign.

SUMMARY OF THE INVENTION

The present invention relates to electronic digital direct-mail collateral.

A mailer can be sent via the mail or distributed by a company to is customers or potential customers such as a promotional done by a bank or retail establishment.

It is an object of the present invention for the direct mailer to comprise a card stock mailer printed with branded advertising information and graphic.

It is an object of the present invention for the mailer to be similar to a CD case, center hinged.

It is an object of the present invention for the mailer to be approximately ¼ to 1 inch thick.

It is an object of the present invention for the mailer to comprise digital memory for video storage and playback.

It is an object of the present invention for the mailer to comprise a LCD screen or other television display for video playback.

It is an object of the present invention for the mailer to comprise a microphone to record message.

It is an object of the present invention for the mailer to comprise a digital recorder with a 30 second to 15 minute playback to allow the recipient to hear the specialized announcement.

It is an object of the present invention for the mailer to comprise a button switch to begin playback.

It is an object of the present invention for the mailer to comprise a speaker for playback volume and clarity.

It is an object of the present invention for the mailer to have a power source.

It is an object of the present invention for the mailer to comprise a battery.

It is an object of the present invention for the mailer to comprise digital cell phone electronics—pre programmed to enable the recipient to make the connection to the call-center from the direct mail collateral.

The present invention relates to a mailer which is sent through the mail in different configurations, the recipient presses a button and either hears a message, sees a video or both, directing them to call a number at a call-center to verify the customer information in the mailer, activate a rewards card for discounts and special promotions, confirm special appointments and also to answer specific questions about preferences and interests which are developed by the sender.

It is an object of the present invention for the mailer to incorporate cell phone electronics that connects directly to the call-center at a touch of a button.

It is an object of the present invention for the device to be used for business to consumer marketing, business to business marketing, media and press kits, special invitations and all special event notifications.

It is an object of the present invention for the device to contain buyer incentives and have the ability to play promotional video and then, by either logging onto a website or by pressing a button enabling instant bidirectional verbal communication between a consumer and a sender's call center to quality the interest, confirm the consumers preferences and/or elicit additional information which is compiled to a database for current or future marketing initiatives.

It is an object of the present invention to provide a direct mailer that incorporates a digital display. It is an object of the present invention for digital display to have a size range from 1.5 to 4 inches. It is an object of the present invention for the digital display to vary in size. It is an object of the present invention for a recipient to open the package and be instructed to press a button, which turns on the device and begins playback of an encoded commercial. The commercial can be video, audio or both. It is an object of the present invention to provide an encoded card synchronized to the in house or database mailing list. The device is designed to capture recipient interest and trigger a call to action, either a web registration or telephone call as directed by the digital image.

It is an object of the present invention to provide a custom direct mailer than incorporates a digital cell phone and optional encoded card. A recipient opens the package and is instructed to press a button which makes a direct call to a live call center operator or sales representative. The device allows an immediate opt-in by the recipient, instant qualification of preferences and provides a direct connection for product information which could result in sales of products and/or services during the call. When distributed to a database owned by a third party, retailer or department store, the information collected during the recipient call captured directly to the marketers database for subsequent direct campaigns.

It is an object of the present invention to provide a direct mailer that incorporates a digital display which ranges in size from 1.5 to 5 inches. The recipient opens the package and is instructed to press a button which turns on the device and begins playback of an encoded commercial. Immediately afterwards the recipient can press the phone button which makes a direct call to a live call center.

It is an object of the present invention to provide a direct mailer which provides a digital touch screen telephone and optional card. The recipient opens the package and is instructed to press a button, which turns on the device and begins playback of an encoded commercial. Immediately afterwards the recipient can press an alternate screen icon and make a direct call to a live call center.

It is an object of the present invention to provide at a direct mail administrator dash board to track campaigns and run reports on a per month basis to clients. This system houses the client database and tracks all incoming calls through its call centers.

It is an object of the present invention to provide a direct mailer with digital It is an object of the present invention to provide a display integration.

It is an object of the present invention to provide a direct mailer with recorded sound chip, wherein the sound chip makes the recipient feel like he has connected to a call center operator or computer system.

It is an object of the present invention to provide a media kit with digital display integration.

It is an object of the present invention to provide a mailer with interactive digital catalog.

It is an object of the present invention to provide a mailer with interactive digital camera.

It is an object of the present invention to provide a mailer with GPS locator.

It is an object of the present invention to provide a digital retail signage with kiosk.

It is an object of the present invention to provide a PDA or tablet retail data capture.

It is an object of the present invention to provide other digital connections.

It is an object of the present invention to produce a credit card or rewards card on the back of a phone and either make it a credit card or a membership rewards card that is also a phone.

BRIEF DESCRIPTION

DETAILED DESCRIPTION

In one embodiment of the devices used to provide doctors with a patient drug therapy information kits including the one button phone for toll free calls to a branded clinician to assist in asking questions about the drugs.

In one embodiment mortgage companies mail the product to customers who press one button to see a video on refinancing, home equity loans or other services and then presses a further button to call a representative to find out information about this.

An embodiment includes a one button phone. Company sends out mailer to customer (receiver). Customer opens the mailer and presses the button and calls the company call center. Sales representative at call center receives the call and goes through script to confirm the customer's contact information and logs in the call (possibly recording the call) into the dashboard. The sales rep asks a few qualifying questions and determined the best way to reach the customer. The customer's rewards card is activated to receive additional bonuses and promotions.

An embodiment includes a video player. Company sends out mailer to customer (receiver). Customer opens the mailer and presses the button to view a video (commercial) on the promotion. The customer will then call a designated number included in the packaging, go to a branded website, or go into the store or location to activate the rewards card included in the mailer.

An embodiment includes a phone and video player. Company sends out mailer to customer (receiver). Customer opens the mailer and presses the button to view a video (commercial) on the promotion. Customer then presses another button and calls the company call center. Sales representative at call center receives the call and goes through script to confirm the customer's contact information and logs in the call (possibly recording the call) into the dashboard. The sales rep asks a few qualifying questions and determined the best way to reach the customer. The customer's rewards card is activated to receive additional bonuses and promotions.

An embodiment includes a touch-screen phone and video player. Company sends out mailer to customer (receiver). Customer opens the mailer and presses the button to view a video (commercial) on the promotion. Customer then presses another button and calls the company call center. Sales representative at call center receives the call and goes through script to confirm the customer's contact information and logs in the call (possibly recording the call) into the dashboard. The sales rep asks a few qualifying questions and determined the best way to reach the customer. The customer's rewards card is activated to receive additional bonuses and promotions.

An embodiment includes a fake connect phone. Company sends out mailer to customer (receiver). Customer opens the mailer and presses the button to hear a recorded message on the promotion. The recorded message includes fake digital connection sounds or sound-effects to give the illusion that the customer connected to a computer to activate their rewards or membership card. This is of course, not true, all it did was just play a recorded message. Included within the message are instructions to activate the rewards or membership card by either calling a telephone number for the campaign, a branded website or to visit a store or location to swipe on a computer terminal or kiosk. The customer will then call a designated number included in the packaging, go to a branded website or go to the store or location to activate the rewards card included in the mailer.

Ingredients in the campaign:
1. Printed mailer designed for marketing campaign
2. Encoded Rewards or Membership with magnetic-strip on back
3. Connect Iteration
   a. One Button or Multi-Button Phone
   b. Video Player
   c. One Button or Multi-Button Phone and Video Player
   d. Touch-screen Phone with Video Dashboard An online marketing system that keeps track of all campaigns. This dashboard can be integrated into other online advertising dashboards to provide a marketer to view all campaign initiatives (email, banner ads, print, signage, telemarketing, radio, broadcast, niche-cast, etc.) The call center uses this system to log in incoming calls from customers that press the button to call to activate the rewards or membership cards. The system has information relating to any conversations (vocal or non-vocal) with the customer. This includes if the customer presses the button to call the center, goes to the campaign website(s), visits a store or other location and swipes the rewards or membership card at any computer terminal or kiosk, mails back any form for more information or purchase, calls a designated number associated with the campaign.

An embodiment of the invention includes a pharmaceutical company can give patient care package kit including device literature, video to show instructions on how to use and care for device, a preprogrammed phone (one or multi-button or traditional keypad or touch-screen) that when pressed, will call a clinician help desk to speak directly to the patient on any frequently asked questions or tier one questions the patient may have. Any more detailed, or highly specific questions regarding the patient, can be escalated up to tier two and the patient will be directed back to their physician with an appointment. It is possible to provide further services for this industry. These solutions would allow the a small phone to be packaged with the drug, and when the patient agrees that they have read the instructions or have watched the video on how to use the drug or device, they will press a button that will send a transmission of this to the call center to log it into the system. This can be done for each and every time the patient will administer the drug.

Credit Card Phone with encoding—Slim credit card Size phone with an encoded magnetic-strip on back Connect Packaging—Packaging with a programmed phone included in the packaging. It is possible to include a small phone in the bottle cap of the medicine, or in the side of the packaging of the electronic device. E.g. if a electronic device, like a television comes with a built-in phone that when the customer presses a button, will call a service help desk or a sales rep to upgrade service or any promotion from the manufacturer or partner product or service, including, but not limited to, cable or dish network.

The direct mail marketing of the present invention addresses the fundamental objectives of a direct mail campaign as categorized;
   a. Direct opt-in data capture on prospect
   b. Direct marketing message
   c. Instant response capabilities
   d. Non-invasive Push marketing strategy
   e. Accurate, statistical "real time" campaign results as monitored in the EMG dashboard
   f. Accurate R.O.I. information
   g. Accurate mailing list development The present invention comprises a customized printed mailer either a card or box-like package. The invention further comprises a plastic card (reward or membership) with encoded magnetic-strip on front or back. The present invention further comprises a direct digital mailer having the following options:
   a. Simple card mailer with activation button, speaker and digitally recorded message on an electronic "chip"
   b. Mailer containing a video player with speaker and multiple screen size options
   c. Mailer containing a video player with speaker and a 1 button or multi-button battery powered pre-programmed phone
   d. Pre-programmed touch screen phone with video playback capacity
   e. GPS capable phone In an embodiment the device of the present invention is used for patient education programs. It is vitally important that the patient adhere to a strict regulated application of this drug or the patient may receive adverse effects. By utilizing this system, patient acceptance is achieved, patient receives total response from drug, pharmaceutical company receives "blind" data about instances, doctor patient communications are enhanced, and insurance costs are reduced. All instances and data capture are HIPAA compliant and all instances with adverse events are reported with MedWatch system.

In an embodiment a pharmaceutical company provides a doctor with a device of the present invention which includes a package containing literature on the drug prescribed to the patient, a video player and a simple phone. The video player, or emg connect show, plays an interactive tutorial on the drug, how-to videos and other pertinent information regarding the drug. This video device is able to be taken out of the packaged kit and used repeatedly by the patient if they need to review at a later time. It is also possible to download additional videos from the internet for updated and fresh content pertaining to the drug. In addition, there is a preprogrammed phone, or emg connect alert. The patient can press a button and contact a clinician help desk, to answer more specific information about the drug, or how to administer the drug. This instance would be scripted by the pharmaceutical company with basic frequently asked questions, or tier one level consultations. The clinician helping the patient can use the dashboard and issue a ticket for this instance. The clinician will record the conversation, and upon completion, will close the ticket. More detailed or specific information must be escalated to tier two, and the ticket will remain open. The clinician will send a message to the physician to schedule an appointment or phone consultation with the patient at a later time. If this is an emergency, the patient will press a second button to get connected to an emergency response number or 911, or if the patient is speaking to the clinician, the clinician will contact the emergency response immediately. After such time that the instance between the patient and doctor is completed, the doctor will close the ticket in the system. The system records all instance information pertaining to the patient, and when necessary, report any adverse events to the MedWatch system. In addition, the dashboard can be integrated with an electronic medical records system for a complete view of the patient's care.

In an embodiment the invention relates to a mask connection. A mailer with a membership rewards card, and integrated with a sound chip to make the card appear to connect to the call center, but in fact, only is programmed with a recorded message (e.g. your membership has been registered, to activate the membership rewards card, please call a phone number or go to a website. Digital Display Integration—mailer with the membership rewards card and a small digital display (size screen from 1.8" to 3" display). This is packaging with an integrated digital display that when the receiver pushes a button, plays a "commercial" (with video/audio) of the promotion or product/service being promoted.

In an embodiment the invention relates to a digital display mask connection—mailer with 1 and 2 integration.

In an embodiment the invention relates to a digital connection. Mailer with the membership rewards card, and "real" direct connection device. The customer presses a button on the mailer and connects to a "Live" customer call center, where the customer can interact with the representative to schedule an appointment at the store, salon, showroom or office, purchase the product/service in the promotion, and/or activate the membership rewards card to gain incentives with the company and its products/services.

In an embodiment the invention relates to a digital catalog. A catalog mailed to the customer, allowing a catalog of products to be displayed on screen, and a customer can then purchase a product from the mailer. (e.g. similar to a website, but offline, connected through our direct connection solution for ordering).

In an embodiment the invention relates to a Digital Media Kit. A sales or marketing kit that incorporates a digital display and plays a "commercial" or promotion. This media kit can be used in publicity direct with editors and news, potential clients or messaging between companies.

In an embodiment the invention relates to a digital GPS connection. Taking this a step further, the mailer can incorporate a GPS device in the packaging, and the company can track where the mailing went to, incorporate campaigns around this environment, or build into different connection elements, outlined above.

In an embodiment, the mailer integrates with a digital camera or digital video recorder to have customers participate with the brand. A customer can take a snap-shot or a video and the media file can be uploaded through a wireless connection integrated into the mailer to a call center to provide feedback to the customer. The car dealer, for instance, can "listen" to the car's engine, and understand certain problems. A technician can then schedule an appointment for the customer to come in for service. This solution can be used in the skincare industry to capture a person's skin type, and schedule an appointment.

In an embodiment the invention relates to a digital kiosk. This system is positioned in the retail environment or in a captured audience and allows customers to browse through a store's categories and promotions. The membership rewards card is swiped to showcase the promotions and information on screen. A customer can bring in an activated card (encoded membership card matched to their record), and review products and promotions that the store may have, or gather info on products/services. A customer can schedule an appointment or get interested in certain products/services, and the store or captured environment can gain insights into the customer and its habits.

In an embodiment the invention relates to digital advertising. Used in conjunction or stand alone, it allows retailers the ability to showcase their products/services and promotions on screen, changeable from a remote office to all their locations. Plasma and LCD displays on wall and in environment takes static signs in store and transforms them into a dynamic billboard of products/services offered, and helps to drive sales to the store's promotions.

Figure 1:
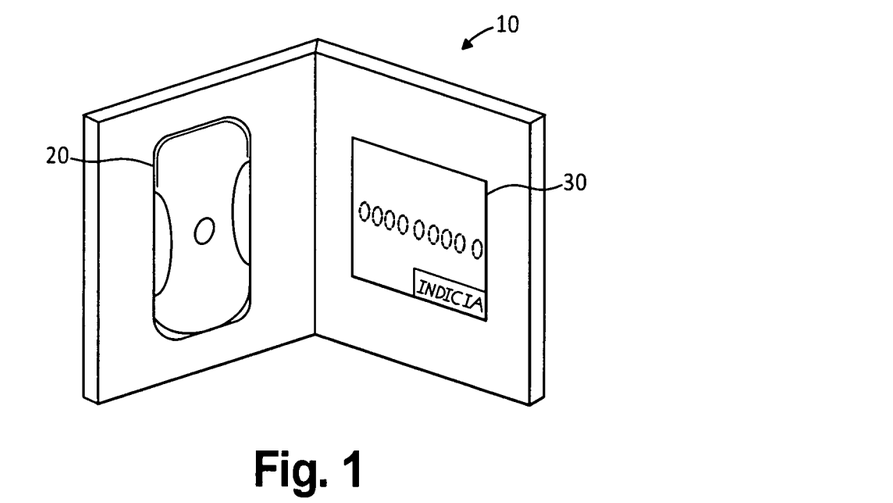
FIG. 1 shows an embodiment of the present invention in its open position.

FIG. 1 shows a mailer 10 having a one button cell phone 20, and an encoded card 30. The recipient opens the mailer 10 and is instructed to press a button which makes a direct call from the cell phone 20 to a live call center operator or sales rep.

Figure 2:
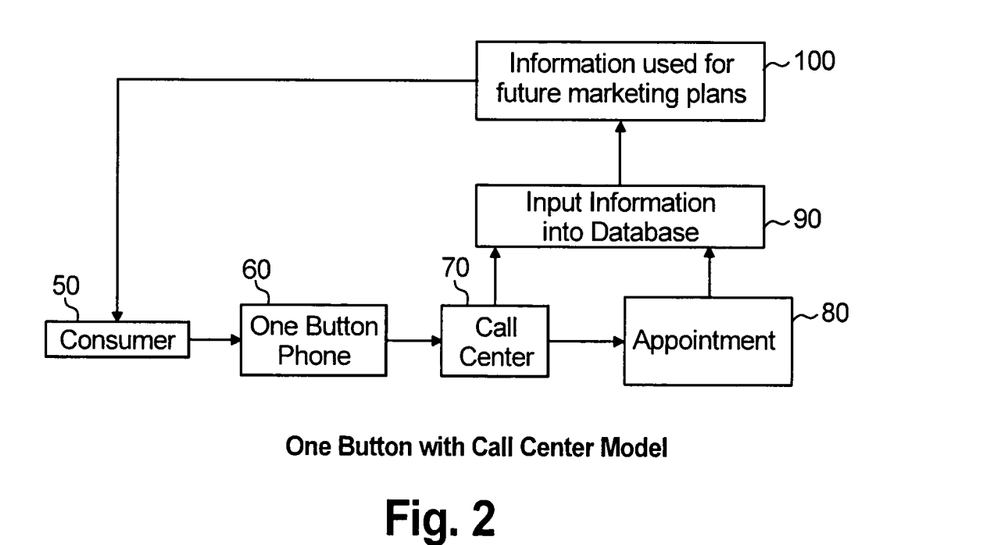
FIG. 2 shows a flowchart of how the device of the present invention works.

FIG. 2 shows a flow chart where a consumer 50 presses a one button phone 60 and calls a call center 70. From the call center a sales information request, or appointment 80 is generated and/or the information is put into a database 90. This information is used for future marketing plans 100.

Figure 3:
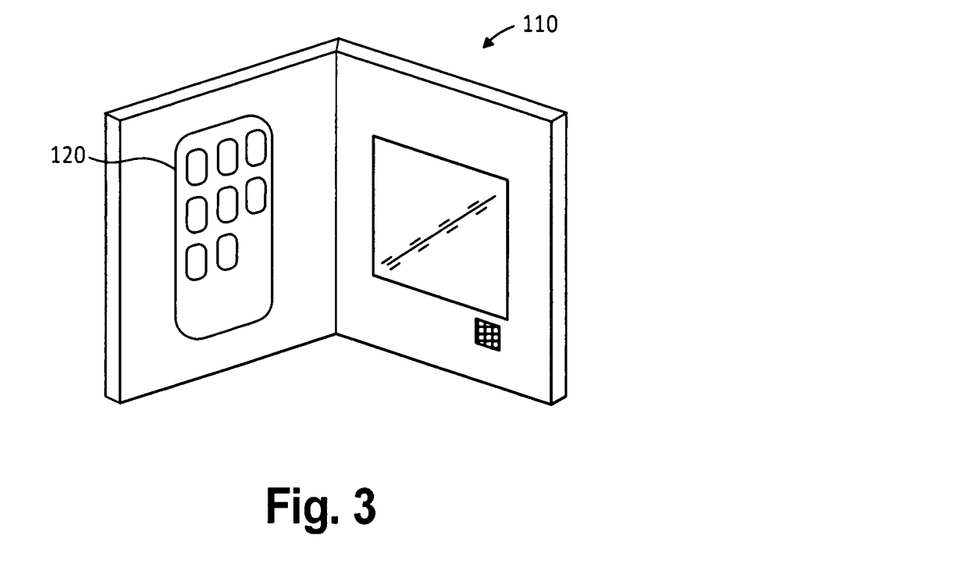
FIG. 3 shows an embodiment of the present invention in its open position.

FIG. 3 shows a mailer 110 having a digital touch screen cell phone 120. The mailer may have a button which turns on the device and begins playback of an encoded commercial (audio or video). The recipient can then call a live call center or sales rep.

Figure 4:
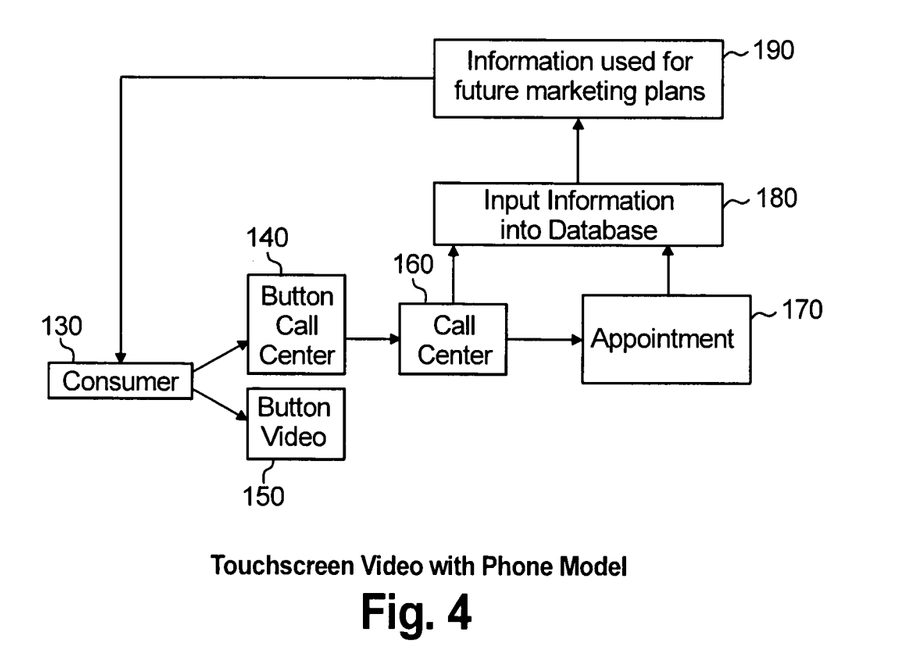
FIG. 4 shows a flowchart of how the device of the present invention works.

FIG. 4 shows a flow chart where a consumer 130 either presses a button 150 which plays a video or presses a button 140 which calls a call center 160. From the call center a sales information request, or appointment 170 is generated and/or the information is put into a database 180. This information is used for future marketing plans 190.

Figure 5:
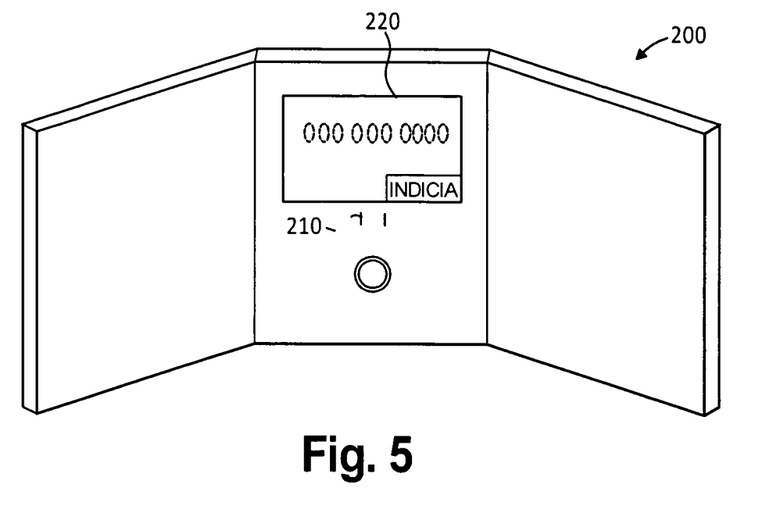
FIG. 5 shows an embodiment of the present invention in its open position.

FIG. 5 shows a tri-fold mailer 200 that incorporates a removable encoded card 220 and a digital sound chip 210, which plays a recorded message after pressing the indicated button. The recorded message begins with a simulated call to an activation center which acknowledges activation, outlines incentive rewards and encourages opt-in and confirms activation.

Figure 6:
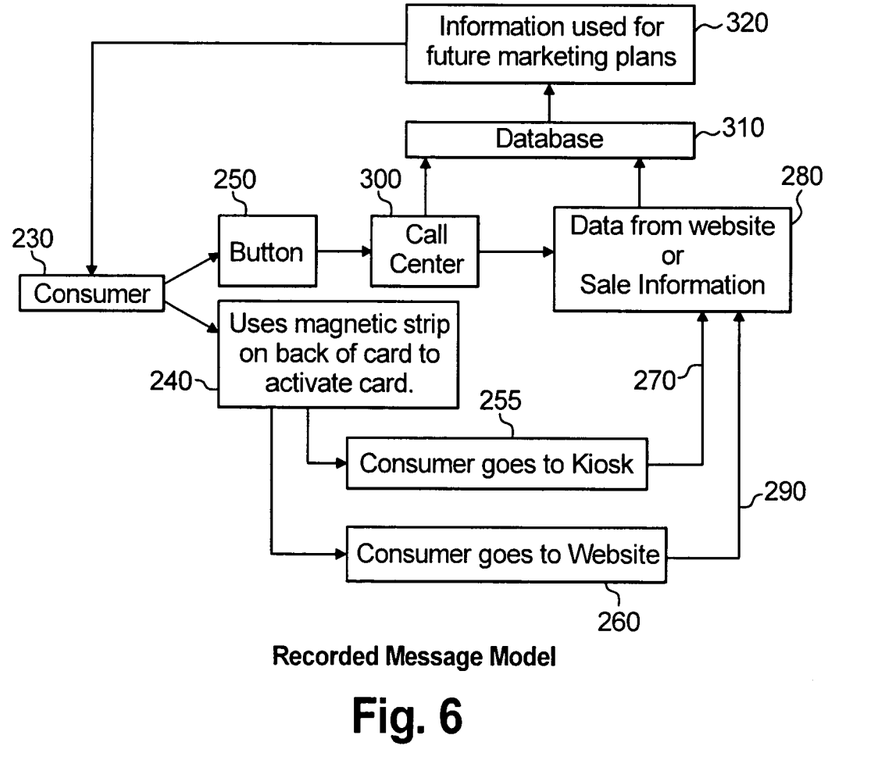
FIG. 6 shows a flowchart of how the device of the present invention works.

FIG. 6 shows a consumer 230 uses a magnetic strip on the back of a card 240 to activate their car, or presses a button 250 to hear a message to call in to a call center. The user can go to a kiosk 255, or the user can log onto a website 260. The user provides the information 270 via the kiosk 255, or the user provides the information 290 from the website to provide a sale 280. The data from the website or sale information 280 or 300 can then be entered into a database 310 to assist with a future marketing plan 320.

Figure 7:
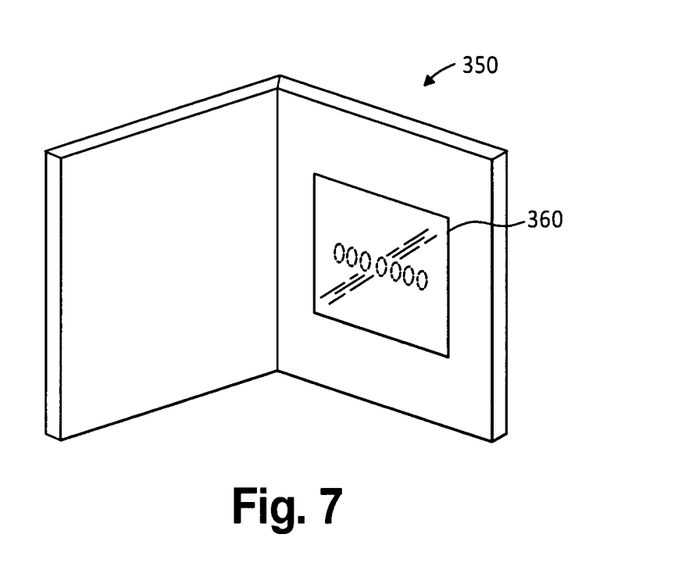
FIG. 7 shows an embodiment of the present invention in its open position.

FIG. 7 shows a mailer 350 that incorporates a digital display 360.

Figure 8:
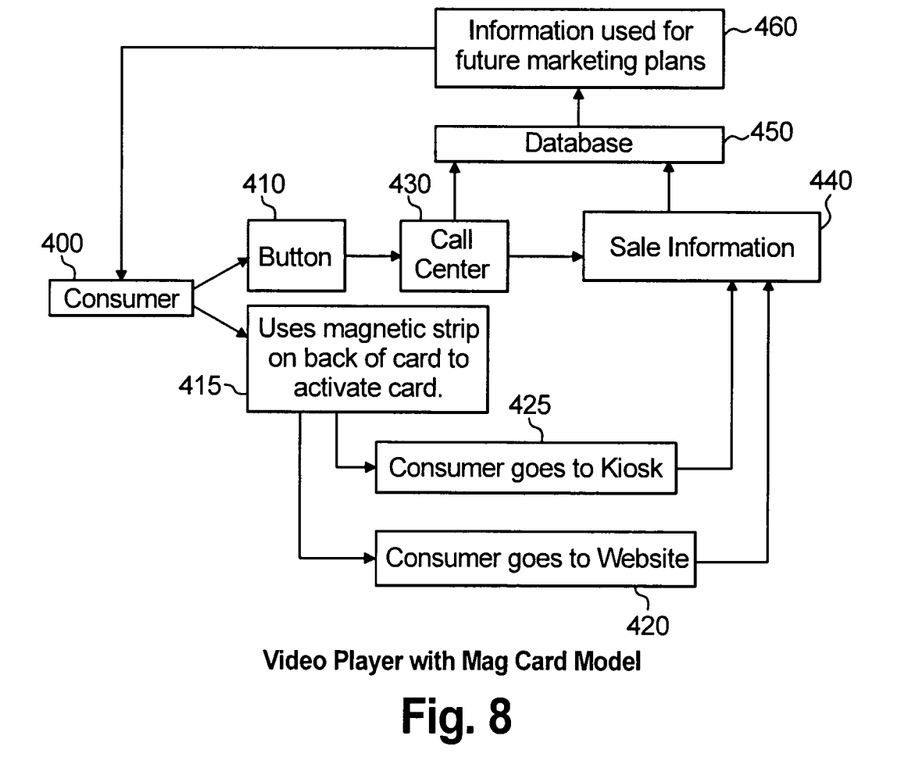
FIG. 8 shows a flowchart of how the device of the present invention works.

FIG. 8 shows a consumer 400 who presses a button 410 to see a message to call in to a call center 430 or log onto a website 420. The user can then provide information from either the website or the call center to provide a sale 440. The data from the website 420, call center 430 or sale 440 can then be entered into a database 450 to assist with a future marketing plan 460. A kiosk 425 can also be used along with the magnetic card 415 as described above.

Figure 9:
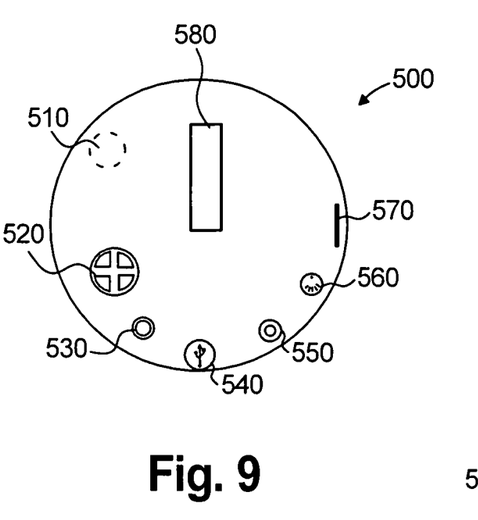
FIG. 9 shows a components view of the device of the present invention.

FIG. 9 is a components view of a device 500. The device 500 has a microphone 510, a speaker 520 and a external microphone 530. The device further has a USB Jack 540, an earphone jack 550, and a connection L.E.D 560. A sim card 570 is also provided. The device works on batteries 580.

Figure 10:
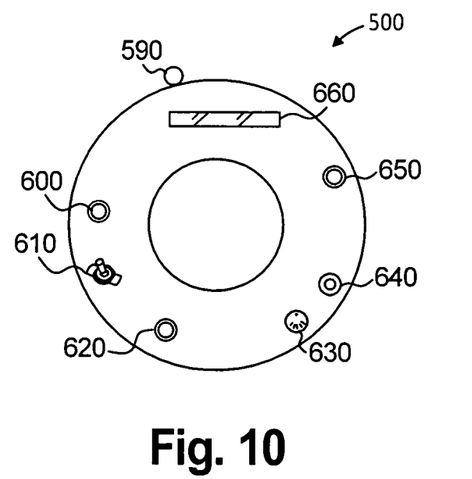
FIG. 10 shows a top view of the device of the present invention.

FIG. 10 shows a top view of the device shown in FIG. 9. The device 500 has a lanyard loop 590, a button 600, an on/off switch 610, and a push button to call 620. The device 500 also has a connection L.E.D. 630, a button 640, a 911 button 650 and a display 660.

Figure 11:
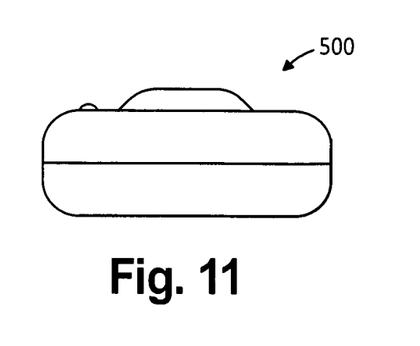
FIG. 11 shows a bottom view of the device of the present invention.

FIG. 11 shows a side view of the device 500.

Figure 12:
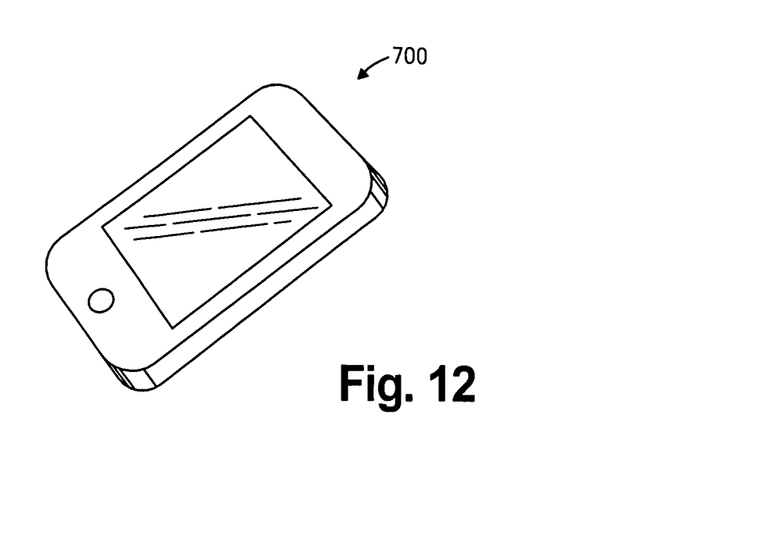
FIG. 12 shows a top view of the device of the present invention.

FIG. 12 shows a video display 700 which comes in different sizes.

Figure 13:
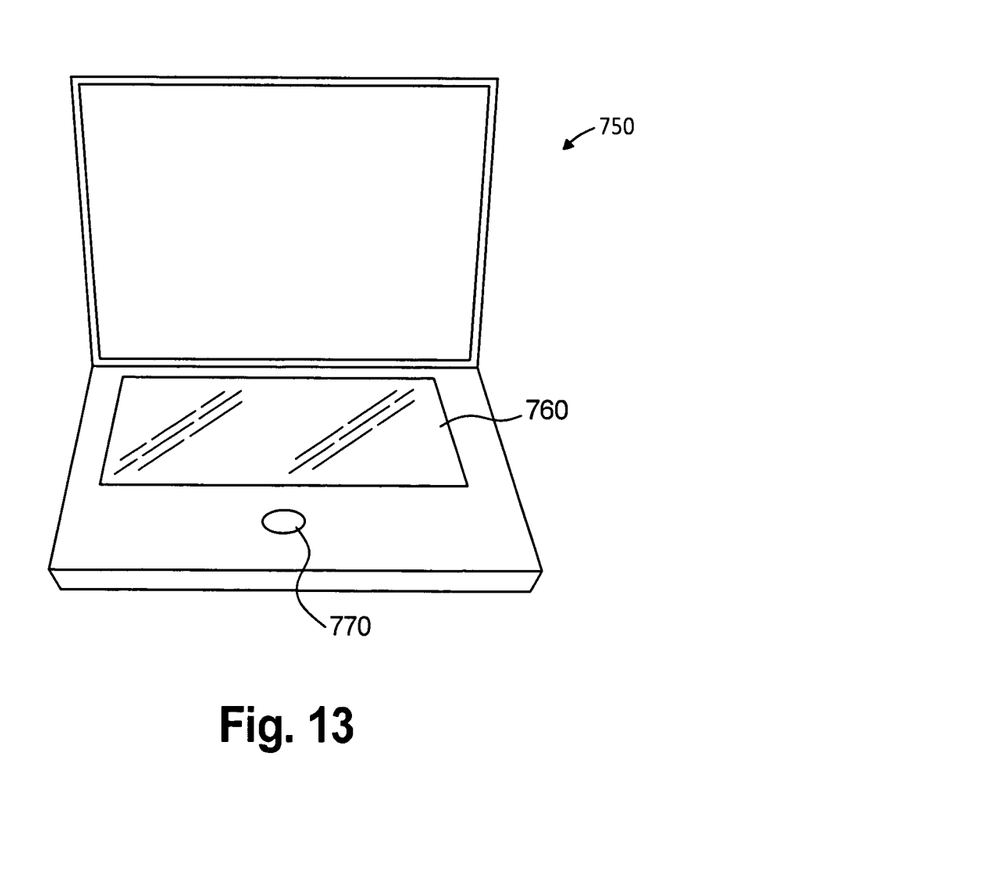
FIG. 13 shows an open view of the device of the present invention.

FIG. 13 shows a device 750, having a video screen 760, and a connection button 770.

The invention claimed is:

1. A direct mail solicitation system comprising:
at least one call center computer, at a call center, executing a dashboard application that logs information relating to incoming calls received from customers using a direct mail solicitation device; and
the direct mail solicitation device enclosed in a single unit package and associated with a direct mail campaign for at least one advertiser, the direct mail solicitation device comprising:

a digital cellular telephone component having only one button preprogrammed with a call center telephone number and operably configured to allow the digital cellular telephone to communicatively couple, over a cellular network, the customer to the call center using the preprogrammed call center telephone number;

a digital display component having only one button operably configured to play a commercial video associated with the direct mail campaign for the at least one advertiser to the customer; and a GPS component operably configured to track a location to which the direct mail solicitation device was mailed.

2. The system according to claim 1, further comprising a database for storing information from customers connecting to said at least one call center computer.

3. The system of claim 1, wherein said digital display is formed as an LCD screen for video playback.

4. The system of claim 1, wherein said direct mail solicitation device further comprises a digital recorder with a 15 second to 15 minute playback.

5. The system of claim 1, wherein said direct mail solicitation device further comprising a speaker.

6. The system of claim 1, wherein said direct mail solicitation device further includes a power source.

7. The system according to claim 1, further comprising an encoded card synchronized to an in house or purchased database mailing list.

8. The system according to claim 1, wherein the digital display component is formed as a digital touch screen display.

9. The system according to claim 1, wherein the dashboard application is operably configured to collect data from the call center to track campaigns and run reports.

10. The system according to claim 1, wherein said direct mail solicitation device further comprises a recorded sound chip.

11. The system according to claim 1, wherein said direct mail solicitation device further comprises a digital camera.

12. The system according to claim 1, wherein said the GPS component comprises a GPS locator.

13. The system according to claim 1, further comprising a credit card or rewards card.

14. The system according to claim 1, wherein said dashboard application is communicatively coupled to other call center dashboards to provide a marketer to view all campaign initiatives including at least one of email, banner ads, print, signage, telemarketing, radio, broadcast, and/or niche-cast; and said at least one call center computer logs in incoming calls from customers that press a button to call the call center in order to activate rewards and/or membership cards.

\* \* \* \* \*